United States Patent Office 3,595,629
Patented July 27, 1971

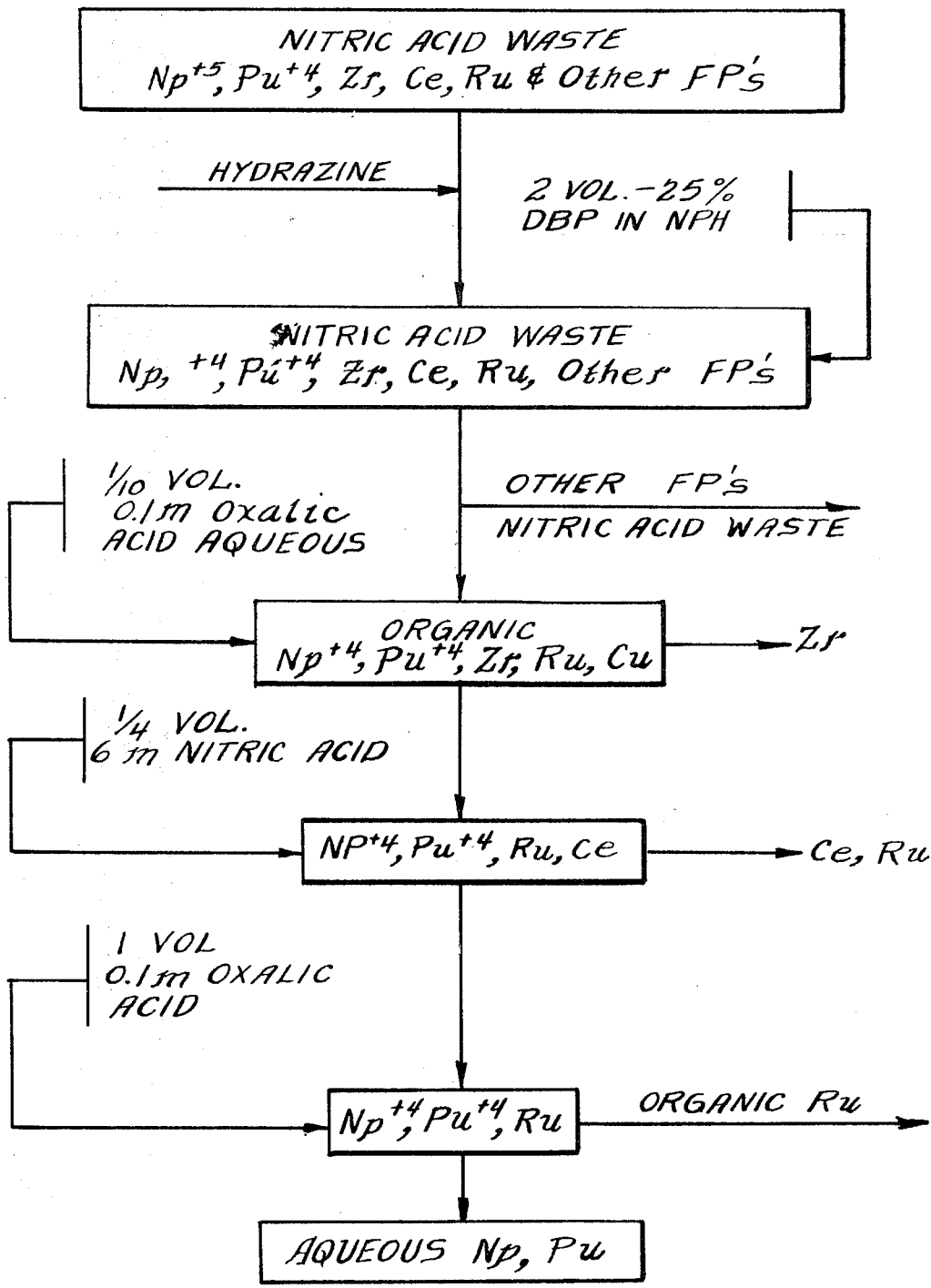

3,595,629
PLUTONIUM AND NEPTUNIUM EXTRACTION PROCESS
Wallace W. Schulz, Richland, Wash., assignor to the United States of America as represented by the United States Atomic Energy Commission
Filed Aug. 14, 1969, Ser. No. 850,150
Int. Cl. B01d 11/04; C01g 56/00
U.S. Cl. 23—341          3 Claims

ABSTRACT OF THE DISCLOSURE

A process of separating plutonium and neptunium values from aqueous acid waste solutions containing these and other values by adding hydrazine to the aqueous waste solution to reduce selectively the neptunium to the tetravalent state and contacting the solution with a water immiscible organic solution of dibutylbutyl phosphonate to extract the tetravalent neptunium and plutonium values plus zirconium, cerium and ruthenium values present. After separating the organic phase from the aqueous waste solution, the coextracted zirconium, cerium and ruthenium values are scrubbed from the organic phase before stripping the neptunium and plutonium values with an aqueous oxalic acid stripping solution.

CONTRACTUAL ORIGIN OF THE INVENTION

The invention described herein was made in the course of, or under, a contract with the United States Atomic Energy Commission.

BACKGROUND OF THE INVENTION

This invention relates to the extraction of plutonium and neptunium values from aqueous solutions and in particular with an improvement in the so-called Purex process. The Purex process broadly comprises the extraction of actinide values away from fission product values from aqueous nitric acid solutions of nuclear fuel with organic tributyl phosphate solution.

The Purex process produces a high level radioactive waste solution which contains from 15 to 35% of the $Np^{237}$ contained in the reactor fuel being reprocessed and substantial amounts of $Pu^{239}$ in addition to fission products.

Tertiary alkyl amines, including trilaurylamine, have been used for the recovery of neptunium and plutonium values from aqueous nitric acid solutions. This is the subject matter of assignee's U.S. Pat. Nos. 3,047,360, granted to John C. Sheppard on July 31, 1962, and 3,346,345, granted to Wallace W. Schulz on October 10, 1967.

It has been discovered that trilaurylamine is susceptible to radiation and chemical damage when contacted with the high level radioactive waste solution. Radiolytically-generated nitrite ion in the waste solution appears to catalyze or otherwise promote degradation of the tertiary amine and cause precipitation of intractable white solids in the trilaurylamine extractant. These solids complicate plant-scale operations and have been a major deterrent to the use of the trilaurylamine to the extent that the $Np^{237}$ is not presently recovered from the waste solution, but instead is disposed of with the fission products contained in the waste solution.

BRIEF DESCRIPTION OF THE DRAWING

The drawing shows a flow sheet of the process of this invention.

SUMMARY OF THE INVENTION

I have developed a process for the recovery and concentration of neptunium and plutonium values from highly radioactive acid waste solutions which eliminates much of the problem enumerated above and which also eliminates several other problems not heretofore mentioned. My process consists of contacting the waste solution, after appropriate reduction of the neptunium values, with an organic extractant of dibutylbutyl phosphonate (hereinafter referred to as DBBP) which removes almost all of the plutonium and neptunium values and some of the cerium, zirconium and ruthenium values present in the acid waste. The zirconium and some of the cerium values are removed from the organic solution with an oxalic acid scrub. Additional cerium and ruthenium values are then scrubbed with a nitric acid solution. The neptunium and plutonium values are then stripped from the organic extractant with an oxalic acid solution and after destruction of the oxalate are returned to a Purex process stream in a highly purified and concentrated form for recovery from the process with the neptunium and plutonium values already present.

Several other advantages are apparent with the use of this process. The DBBP is 5 to 10 times more effective than tributyl phosphate in extracting tetravalent actinides from nitric acid solutions, thus permitting over 90% neptunium recovery in a single batch contact.

When used as a supplement to the mainline Purex process, the function of this invention is to recover any neptunium lost to the acid waste stream and to purify it enough to permit its return to the mainline Purex process. Purification from zirconium is especially important. Essentially all of the zirconium in the acid waste solution coextracts and, unless otherwise removed, also costrips with the neptunium. Recycle of such a strip solution to the Purex main stream would eventually result in a greatly increased steady-state concentration of zirconium which could result in decreased decontamination of plutonium and neptunium values from the zirconium. This problem can be easily overcome by the process of this invention by the oxalic acid scrub which removes over 80% of zirconium from the organic extractant.

It is therefore one object of this invention to provide a process for the removal of neptunium and plutonium values from acid waste solutions.

It is another object of this invention to provide a neptunium-plutonium extraction process which is relatively insensitive to radiolytic damage.

It is a further object of this invention to provide a neptunium-plutonium extraction process which also permits the separation of the undesirable zirconium values present in the acid waste solution.

Finally, it is an object of this invention to provide a process for the extraction of neptunium and plutonium values from an acid waste solution which is compatible with the Purex process for reprocessing nuclear reactor fuels.

DESCRIPTION OF THE PREFERRED EMBODIMENT

These and other objects of the invention may be attained by making the acid waste solution from 0.025 to 0.05 M in hydrazine to adjust the neptunium to the extractable tetravalent state. The adjusted acid waste solution is then contacted with a two-volume portion of organic extractant which is 25% DBBP in a water-immiscible organic diluent. This extracts the neptunium and plutonium values which are present in the acid waste in addition to varying amounts of cerium, zirconium and ruthenium which are fission product values also present in the acid waste. The organic extractant is then contacted with 1/10 volume of 0.1 M aqueous oxalic acid scrub solution which will remove almost all of the zirconium values and about one-half of the cerium values present. The organic extractant is then contacted with 1/4 volume of 6 M nitric acid scrub solution to remove the remaining cerium values and most of the ruthenium values present in the organic extractant. The neptunium and plutonium values are then stripped from the organic extractant by contacting the extractant with an equal volume of 0.1 M oxalic acid. From this solution the plutonium and neptunium values may be recovered, separated and further purified or the strip product may, after destroying the oxalate by reaction with boiling nitric acid, be concentrated and recycled to the mainline Purex process where the plutonium and neptunium values can be separated in normal recovery channels.

A satisfactory water-immiscible organic diluent is a straight chain normal paraffin hydrocarbon (hereinafter referred to as NPH) containing 10 to 14 carbon atoms. Other solvents such as dodecane or kerosene are also satisfactory. The concentration of DBBP in the NPH may vary from 20 to 30% although 25% is preferred. Lower concentrations result in decreased extractibility of the desired values while concentrations greater than 30% will give rise to problems in stripping the values from the extractant.

It is preferred that the oxalic acid scrub contains 0.1 M oxalic acid since lower concentrations will not scrub zirconium effectively and higher concentrations will remove the neptunium and plutonium. It is preferred that the nitric acid scrub be 6 M $HNO_3$ and no lower than 4 M $HNO_3$ since cerium scrub efficiency drops off with decreasing acidity.

Solution volumes are important to the successful operation of the method of this invention and are a function of the concentration of the various solutions. Thus best results are obtained when 1/10 volume of 0.1 M oxalic acid and 1/4 volume of 6 M nitric acid are used as scrub solutions and when 1 volume of 0.1 M oxalic acid is used as a strip solution. All contacts between the solutions are best made in 25° C. at contact times of up to one hour to ensure complete ion value transfer. Shorter contact times are desirable to reduce process time cycles and to limit solvent radiolysis.

The 0.1 M oxalic acid scrub solution may be used as a source for further recovery of zirconium values should a demand for zirconium isotopes arise in the future.

The stripped organic extractant is reusable. However, periodically it must be washed with dilute sodium carbonate solution to remove accumulated uranium and ruthenium values.

The following examples are given as illustrative of the process of this invention and are not to be taken as limiting the scope or extent of the invention.

EXAMPLE I

In order to ascertain the effect of radiation upon the DBBP extractant, a synthetic acidic waste solution containing 4.68 M $HNO_3$, 0.79 M $H_2SO_4$, 0.68 M $NaNO_3$, 0.35 M $Fe(NO_3)_3$, 0.125 M $Al(NO_3)_3$ plus varying amounts of other elements was prepared. The waste solution also contained either $Pu(NO_3)_4$ or $NpO_2NO_3$. The solution was made 0.022 M in hydrazine and allowed to stand 30 minutes at 25° C. The resulting solutions were then contacted with double-volume portions of irradiated 25% DBBP in NPH solutions, the results of which are given in the table below.

TABLE I

| Solvent irradiation dose, watt-hrs./liter | Eá | | Percent not extracted | |
|---|---|---|---|---|
| | Pu | Np | Pu | Np |
| 0 | 56.3 | 27.6 | 0.81 | 1.72 |
| 58.7 | 54.2 | 102 | 0.93 | 0.58 |
| 118 | 72.0 | 97.3 | 0.67 | 0.62 |
| 176 | 83.6 | 107 | 0.57 | 0.54 |
| 235 | 100 | 150 | 0.47 | 0.39 |

It can be seen from Table I that irradiation of the DBBP extractant had little effect upon the ability to extract Np and Pu.

EXAMPLE II

In a further experiment to determine the radiolysis-resistant qualities of the DBBP–NPH extractant, the organic solution was irradiated to a total exposure of about 327 watt hrs./liter while in a repetitive, stirred contact with a sequence of aqueous solutions. The sequence and composition of aqueous solutions and control periods used in the example are given below in Table II and are typical for the extraction-scrub-strip-solvent wash cycle which constitutes the process of this invention. The synthetic acid waste solution is of the same composition as that given above.

TABLE II

| Contact type | Aqueous composition | Aq. | Org. | Time, min. | Solvent exposure, watt-hrs./liter |
|---|---|---|---|---|---|
| Extraction | Synthetic acid wash | 100 | 200 | c 84–120 | 3.3–4.0 |
| Scrub a | 6 M $HNO_3$ | 50 | 200 | 5 | 0 |
| Strip a | 0.1 M oxalic acid | 200 | 200 | 5 | 0 |
| Solvent wash a b | 10% $Na_2CO_3$ | 200 | 200 | 5 | 0 | a Done outside Co60 facility.
b Performed only after every sixth extraction-scrub-strip cycle.
c Adjusted according to exposure dose rate in Co60 facility.

The radiation dose given the organic extractant per cycle is roughly that anticipated from contact of the extractant with 1/2 volume of the Purex process waste solution for three hours. The results in Table III below show the excellent radiation stability of the DBBP extractant. Thus, even though neptunium and plutonium distribution ratios decline upon irradiation, the solvent after 96 cycles of irradiation still extracts about 96% of each actinide.

TABLE III

| Cycle Number | Cumulative exposure, watt hrs./liter | Percent extracted | | |
|---|---|---|---|---|
| | | Pu | Np | $Zr^{95}$ |
| 0 | 0 | 99.1 | 98.8 | 83.3 |
| 18 | 59.2 | 98.8 | 97.6 | 87.2 |
| 36 | 118 | 98.6 | 86.6 | 87.6 |
| 54 | 186 | 98.5 | 96.3 | 89.4 |
| 72 | 257 | 98.1 | 95.8 | |
| 96 | 327 | 97.5 | 95.8 | |

Synthetic IWW-1 solution containing either Pu(IV), Np(v) or $Zr^{95}$ made 0.05 M $N_2H_4$ and allowed to stand 30 minutes at 25° C. before contact (A/O=1/2, 10 min., 25° C.) with irradiated solvent.

EXAMPLE III

A series of experiments were run using actual acid waste solutions some of which had aged for one year and some of which were only one week old. In all of the experiments the acid waste solution was made 0.05 M hydrazine and allowed to stand 30 minutes at 25° C. before being contacted 10 minutes with a double volume of organic extractant. In one experiment the 25%

DBBP in NPH organic extractant was irradiated to about 230 watt hrs./liter and in one instance the irradiated solvent was washed with carbonate solution to remove any impurity present. In all other cases the extractant was unirradiated and unwashed. Upon separation of the organic extractant from the acid waste solution, the extractant was first contacted for 10 minutes at 25° C. with 1/10 volume of 0.1 M oxalic acid scrub solution followed by contact with 1/4 volume of 6 M HNO$_3$ scrub solution, again for 10 minutes at 25° C., to remove most of the zirconium, ruthenium and cerium values present. The neptunium-plutonium values were then stripped by contacting the extractant for 10 minutes at 25° C. with one volume of 0.1 M oxalic acid solution. The results of the experiments are given in Table IV below.

whereby some of the cerium and zirconium values are stripped from the organic phase, separating the organic and the aqueous phases, contacting the organic phase with a 0.25 volume of an aqueous scrub solution containing 4–6 M nitric acid whereby most of the cerium values are stripped, separating the organic and the aqueous phase, contacting the organic phase with 1 volume of an aqueous oxalic acid strip solution, thereby stripping the neptunium and plutonium values and separating the aqueous phase from the organic phase.

2. The process of claim 1 wherein the dibutylbutyl phosphonate solution has a concentration of 25%, the organic solvent is a straight chain hydrocarbon and where the organic solution has twice the volume of aqueous acid waste solution.

TABLE IV

| | Experiment number | | | | | |
|---|---|---|---|---|---|---|
| | 1[1] | 2[1] | 3A[1 2] | 3B[1 3] | 4[1] | 5[4] |
| Extraction Contact: | | | | | | |
| ZrNb$^{95}$ Eå | 0.558 | 0.176 | 0.703 | ([9]) | 0.127 | 0.249 |
| RuRh$^{106}$ Eå | 0.170 | 0.208 | 0.128 | 0.140 | 0.359 | 0.095 |
| CePr$^{144}$ Eå | ([9]) | 0.528 | 0.090 | 0.071 | 0.327 | ([9]) |
| Percent not extracted, Pu | ([9]) | 1.0 | 0.91 | ([9]) | 1.8 | 1.0 |
| Percent not extracted, Np | ([9]) | 3.5 | 2.8 | ([9]) | 4.0 | 3.0 |
| Oxalic Acid Scrub: | | | | | | |
| ZrNb$^{95}$ Eå | 0.0104 | ([10]) | ([10]) | 0.0033 | [6 7] 0.0066 | ([10]) |
| RuRh$^{106}$ Eå | 1.07 | ([10]) | ([10]) | 0.665 | [6 7] 0.787 | ([10]) |
| CePr$^{144}$ Eå | ([9]) | ([10]) | ([10]) | 0.080 | [6 7] 0.139 | ([10]) |
| | Part A | Part B | | | | |
| HNO$_3$ Scrub: | | | | | | |
| ZrNb$^{95}$ Eå | ([9]) | ([10]) | 41.7 | 31.1 | 1.4 | ([9]) | ([10]) |
| RuRh$^{106}$ Eå | 0.128 | ([10]) | 0.237 | 0.131 | 0.125 | [6 7] 0.084 | ([10]) |
| CePr$^{144}$ Eå | ([9]) | ([10]) | 0.047 | ([9]) | 0.032 | [6 7] 0.034 | ([10]) |
| Oxalic Acid Strip: | | | | | | |
| ZrNb$^{95}$ Eå | 0.057 | ([5]) | ([5]) | 0.0097 | ([5]) | ([5]) | 0.0059 |
| RuRh$^{106}$ Eå | 12.3 | 2.81 | 13.3 | 13.3 | 11.3 | 4.9 | ([9]) |
| CePr$^{144}$ Eå | ([9]) | ([9]) | ([9]) | ([9]) | ([5]) | ([5]) | ([9]) |
| Overall percentage of Np-Pu recovery | ([9]) | ([9]) | 90 | 91 | ([9]) | 87 | 88 |

[1] With ~1-year-old acid waste solution.
[2] Unwashed irradiated extractant.
[3] Carbonate washed irradiated extractant.
[4] Current acid waste solution.
[5] Not detected in final organic.
[6] HNO$_3$ scrub made before oxalic acid scrub.
[7] Np and Pu losses were 0.71 and 0.57%, respectively.
[8] Np and Pu losses were 0.74 and 0.12%, respectively.
[9] Data not obtained.
[10] Not made.

It can be seen from the results in the table above that the neptunium-plutonium losses are very small and that excellent recovery results are obtained from the process of this invention.

It will be understood that the invention is not to be limited to the details given herein but that it may be modified within the scope of the appended claims.

The embodiments of the invention in which an exclusive property or privilege is claimed are defined as follows:

1. A process for recovering neptunium and plutonium values from an aqueous acidic waste solution containing pentavalent neptunium, tetravalent plutonium, and zirconium, cerium, ruthenium and other fission product values comprising making the acid waste solution 0.025 to 0.05 M in hydrazine to selectively reduce the pentavalent neptunium to tetravalent neptunium, contacting the acid waste with a water-immiscible organic extractant containing 20–30% dibutylbutyl phosphonate, whereby the neptunium and plutonium values and some of the cerium, zirconium and ruthenium values are taken up in the organic phase while the other fission product values remain in the acidic phase, separating the organic from the acidic phase, contacting the organic phase with a 0.10 volume of an aqueous oxalic acid scrub solution 3. The process of claim 2 wherein the oxalic acid scrub has a concentration of 0.1 M oxalic acid, the nitric acid scrub has a concentration of 6.0 M nitric acid and the oxalic strip solution has a concentration of 0.1 M oxalic acid.

References Cited

UNITED STATES PATENTS

| | | | |
|---|---|---|---|
| 2,847,276 | 8/1958 | Butler | 23—341 |
| 2,864,668 | 12/1958 | Baldwin et al. | 23—341 |
| 2,908,547 | 10/1959 | Nicholls et al. | 23—339 |
| 2,982,600 | 5/1961 | Vogler et al. | 23—341 |
| 3,125,410 | 3/1964 | Ballou et al. | 23—341 |
| 3,214,239 | 10/1965 | Hazen et al. | 23—341 |
| 3,288,568 | 11/1966 | Tonijima et al. | 23—341 |
| 3,346,345 | 10/1967 | Schulz | 23—340 |
| 3,378,352 | 4/1968 | Hansen | 23—341 |
| 3,523,765 | 8/1970 | Grieneisen | 23—339 |

CARL D. QUARFORTH, Primary Examiner

F. M. GITTES, Assistant Examiner

U.S. Cl. X.R.

23—19, 23, 339, 343, 344; 252—301.1